US008922654B2

(12) United States Patent
Ellis (10) Patent No.: US 8,922,654 B2
(45) Date of Patent: Dec. 30, 2014

(54) ALGORITHM FOR ADAPTIVE DOWNSAMPLING TO AN IRREGULAR GRID (75) Inventor: Kenneth K. Ellis, Columbia City, IN (US)

(73) Assignee: Exelis, Inc., McLean, VA (US)

( * ) Notice: Subject to any disclaimer, the term of this patent is extended or adjusted under 35 U.S.C. 154(b) by 384 days.

(21) Appl. No.: 13/427,051

(22) Filed: Mar. 22, 2012

(65) Prior Publication Data
US 2013/0250105 A1 Sep. 26, 2013

(51) Int. Cl.
H04N 7/18 (2006.01)
G06T 3/00 (2006.01)
G06T 3/40 (2006.01)
H04N 7/00 (2011.01)
G01C 11/02 (2006.01)

(52) U.S. Cl.
CPC ............ G06T 3/005 (2013.01); G06T 3/4007 (2013.01); H04N 7/005 (2013.01); H04N 7/181 (2013.01); G01C 11/025 (2013.01); G01C 11/02 (2013.01)
USPC .......................................... 348/144; 348/143

(58) Field of Classification Search
CPC .... G06T 3/4007; G06T 3/005; G01C 11/025; G01C 11/02; H04N 7/005; H04N 7/18; H04N 7/181
USPC .......................................................... 348/144
See application file for complete search history.

(56) References Cited

U.S. PATENT DOCUMENTS

| 5,329,595 | A * | 7/1994 | Davies | 382/103 |
| 6,422,516 | B1 * | 7/2002 | Maeda et al. | 244/158.4 |
| 7,019,777 | B2 * | 3/2006 | Sun | 348/263 |
| 7,773,126 | B1 * | 8/2010 | Lee et al. | 348/231.5 |
| 7,826,685 | B2 * | 11/2010 | Riley et al. | 382/299 |
| 7,835,594 | B2 * | 11/2010 | Riley et al. | 382/299 |
| 8,078,009 | B2 * | 12/2011 | Riley et al. | 382/299 |
| 2003/0117511 | A1 * | 6/2003 | Belz et al. | 348/333.11 |
| 2007/0292046 | A1 * | 12/2007 | Johnson | 382/275 |
| 2008/0199077 | A1 * | 8/2008 | Fowell | 382/190 |
| 2009/0012923 | A1 * | 1/2009 | Moses et al. | 706/46 |
| 2010/0038490 | A1 * | 2/2010 | Hofschuster et al. | 244/158.1 |

(Continued)

FOREIGN PATENT DOCUMENTS

WO WO 02080101 A1 * 10/2002 ................ G06T 5/20

OTHER PUBLICATIONS

Walterman, Antialiasing warped imagery using look-up table based methods for adaptive resampling, 1991.*

(Continued)

Primary Examiner — Andy Rao
Assistant Examiner — Shan Elahi
(74) Attorney, Agent, or Firm — RatnerPrestia (57) ABSTRACT A method of adaptive downsampling includes the steps of: (a) receiving input data having a first spatial resolution and a first grid spacing; (b) resampling the input data using an automatically adjustable kernel; and (c) providing output data having a second spatial resolution and a second grid spacing. The second spatial resolution, advantageously, is substantially constant across the second grid spacing. The input data may include image data, and the output data may include resampled, or downsampled image data. The image data may be images of the Earth at a first spatial resolution and a first grid spacing; the output data may be resampled data of the images of the Earth at a second spatial resolution and a second grid spacing.

17 Claims, 6 Drawing Sheets (56) References Cited

U.S. PATENT DOCUMENTS

2010/0309313 A1* 12/2010 Antikidis .................. 348/144
2011/0170797 A1*  7/2011 Johnson .................. 382/275
2011/0298923 A1* 12/2011 Mukae .................... 348/144
2013/0038691 A1*  2/2013 Agranov et al. .......... 348/46

OTHER PUBLICATIONS

Darwish et al, Adaptive resampling algorithm for image zooming, Aug. 1997.*

Walterman, M. et al.; "Antialiasing Warped Imagery Using Look-Up Table Based Methods for Adaptive Resampling"; Proceedings of the SPIE—The International Society for Optical Engineering USA. vol. 1567, 19991, pp. 204-214.

Leprince, S. et al.; "Automatic and Precise Orthorectification, Coregistration, and Subpixel Correlation of Satellite Images, Application to Ground Deformation Measurements"; IEEE Transactions on Geoscience and Remote Sensing, IEEE Service Center, Piscataway, NJ, USA; vol. 45, No. 6, Jun. 1, 2007.

International Search Report and Written Opinion for PCT/US2013/033095, Issued Aug. 26, 2013.

International Preliminary Report for PCT/US2013/033095, Issued Oct. 2, 2014.

* cited by examiner

ALGORITHM FOR ADAPTIVE DOWNSAMPLING TO AN IRREGULAR GRID

FIELD OF THE INVENTION

The present invention relates, in general, to a system and method for downsampling signals from one grid to another. More specifically, the present invention relates to a system and method for downsampling a signal to an irregular grid, by using an adjustable kernel to achieve a downsampled signal with a substantially constant spatial resolution.

BACKGROUND OF THE INVENTION

It is often desirable to take repeated images of the Earth such that each image pixel is located at the exact same location on the Earth's surface. However, it is not possible to collect multiple images from the same exact location and with the same exact pointing angle. Resampling solves this problem by interpolating data samples from the original collection grid, which changes from image to image, to a grid that is fixed with respect to the Earth's surface. There are many other applications where resampling is used to determine signal values at desired locations that are different from those at which the data is collected.

In signal processing, downsampling is a process for reducing the sampling rate of a signal. This is usually done to reduce the data rate, or the size of the data. Downsampling is a special case of resampling. In a typical application, resampling and downsampling map data from one uniform grid to another uniform grid.

Downsampling is similar to resampling, except that the output grid has a sample spacing that is larger than the input grid spacing. The downsampling, however, needs to have a frequency response that is compatible with the output grid spacing, in order to minimize aliasing in the downsampled signal. This may be achieved by suppressing frequencies higher than the following:

$$\tfrac{1}{2}\alpha_r$$

where $\alpha_r$ is the sample interval in the downsampled (or resampled) signal.

An example of downsampling is a reduced resampling by a factor of 2 relative to the resampled signal.

Imaging systems collect pixels on a collection grid that has approximately uniform angular spacing in the instrument's coordinate system. In many applications, it is desirable to map these pixels to a uniform geo-centric angular grid, such as latitude-longitude. The function that maps the collection sample grid to the Earth's surface is nonlinear. Accordingly, a uniform grid on the Earth's surface maps to a nonuniform grid in the instrument's coordinate system, and a uniform grid in the instrument's coordinate system maps to a nonuniform grid on the Earth's surface. Downsampling under these conditions presents two challenges, because the output grid spacing varies throughout the field-of-view (FOV). First, susceptibility to aliasing varies throughout the FOV. Second, the spatial resolution on the Earth's surface also varies throughout the FOV.

As will be described, the present invention addresses the above two challenges and provides a solution to each one.

SUMMARY OF THE INVENTION

To meet this and other needs, and in view of its purposes, the present invention provides a method of adaptive downsampling. The method includes the steps of:

receiving input data having a first spatial resolution and a first grid spacing; resampling the input data using an automatically adjustable kernel; and providing output data having a second spatial resolution and a second grid spacing. The second spatial resolution is substantially constant across the second grid spacing.

The input data includes image data, and the output data includes resampled data of the image data.

The image data are images of the earth at the first spatial resolution and the first grid spacing. The output data are resampled data of the images of the earth at the second spatial resolution and the second grid spacing.

The method also includes the steps of determining the automatically adjustable kernel. Determining the automatically adjustable kernel includes:

(a) determining MTF of the instrument as a function of spatial frequency;
(b) determining a function that maps the second grid spacing of the output data to the first grid spacing of the FOV of the instrument; and
(c) calculating the kernel for each of the grid locations, in which the MTF has a predetermined value. Calculating the kernel may include finding a spatial frequency in which the MTF has a value of 0.5.

Calculating a derivative of the function at each of multiple grid locations of the second grid spacing, and using the derivative to obtain a kernel at each of the multiple grid locations. A respective kernel for each of the grid locations is stored in a look-up table (LUT).

Another embodiment of the present invention is a system for resampling an image. The system includes an imager for viewing a scene and obtaining samples of the scene in a first coordinate system, and a display for viewing the scene in a second coordinate system. A processor is included for calculating an adaptive kernel at each location of the samples in the first coordinate system, and for obtaining a resampled image of the scene in the second coordinate system using the adaptive kernels. The adaptive kernels provide a substantially constant spatial resolution of the resampled image.

The imager is located in a satellite for monitoring the Earth, and the processor is disposed in the satellite. The processor may also be disposed in a ground station, in which a transmitter sends the samples of the scene to the ground station. The display may also be disposed in the ground station.

The processor executes the following steps:
(a) determining MTF of the imager as a function of spatial frequency;
(b) determining a function that maps the samples in the first coordinate system into the resampled image in the second coordinate system; and
(c) calculating a respective adaptive kernel at each of the locations in the first coordinate system using a predetermined value of the MTF;
(d) calculating a derivative of the function at each of the locations of resampled image in the second coordinate system, and
(e) using a respective derivative to obtain a respective adaptive kernel It is understood that the foregoing general description and the following detailed description are exemplary, but are not restrictive, of the invention.

BRIEF DESCRIPTION OF THE FIGURES

The present invention may be understood from the following detailed description when read in connection with the accompanying figures.

DETAILED DESCRIPTION OF THE INVENTION

Resampling may be accomplished by convolving samples of a resampler impulse response function (IPR) with the input signal samples. A procedure for resampling is shown in the following equation, which includes a convolution. The $m^{th}$ resampled signal sample is as follows:

$$s(\alpha_d, \phi_d, m, \alpha_r, \phi_r) = \sum_{n=-\infty}^{\infty} g(n\alpha_d + \phi_d) h_r(n\alpha_d + \phi_d - m\alpha_r - \phi_r)$$

where $\alpha$ denotes sample intervals,
 $\phi$ denotes phasing,
 d denotes input grid parameters,
 r denotes resampled grid parameters,
 $g(\alpha)$ denotes the input data, and
 $h_r(\alpha)$ denotes the resampler impulse response function (IPR).

The above equation is a discrete sum that may be calculated so long as either $g(\alpha)$ or $h_r(\alpha)$ has a finite extent. The resampler IPR usually has a small finite size (e.g. 3 to 5), which permits exact calculation of the resampled data values.

It will be appreciated that the argument of the resampler function, namely, $n\alpha_d + \phi_d - m\alpha_r - \phi_r$, is the distance between the input grid locations and the output grid locations. Thus, the resampled signal value at a given location may be obtained by the following steps:

(1) centering the resampler IPR on the output grid location,
(2) sampling the resampler IPR at the input grid locations,
(3) multiplying each IPR sample by the corresponding input sample, and
(4) summing over the resulting samples.

Figure 1:
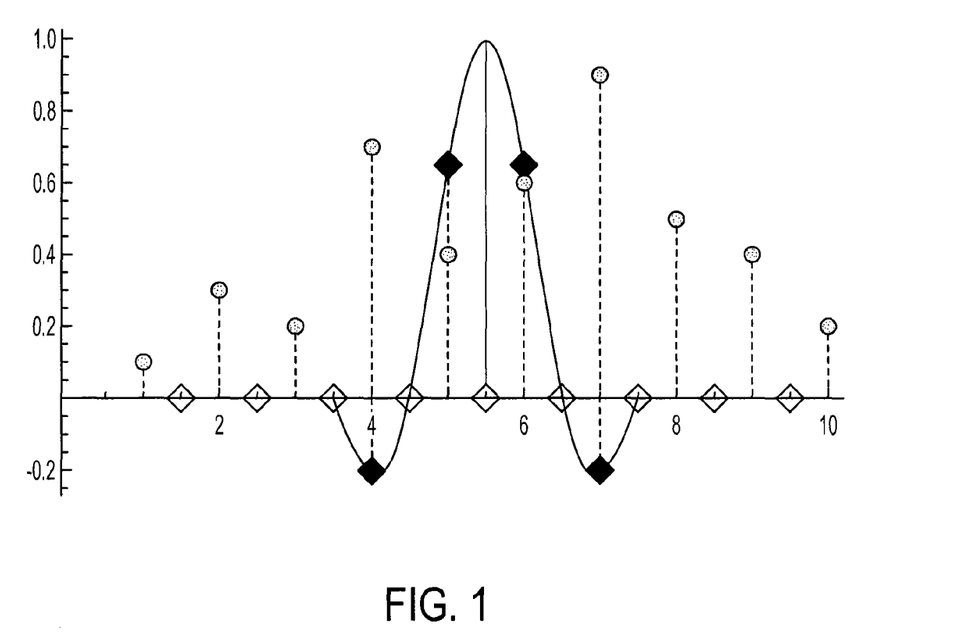
FIG. 1 shows an example of resampling using convolution.

This process is illustrated in FIG. 1. As shown, the input signal (represented by dots) is to be resampled to the output grid, which is represented by hollow diamonds. The resampler IPR is shown centered on one of the output grid locations, namely location 5. The IPR is then sampled at the input grid locations (shown as solid diamonds). It will be appreciated that the IPR samples are the weights by which the input samples are multiplied. The resampled (output) value is the weighted sum of the four input samples (in this example) near the output grid location.

Downsampling is resampling to an output grid having a sample spacing that is larger than the input grid spacing. A downsampling IPR needs to have a frequency response that is compatible with the output grid spacing, in order to minimize aliasing in the downsampled signal. This may be accomplished by ensuring that the IPR suppresses any frequencies higher than $\frac{1}{2}\alpha_r$.

Figure 2A:
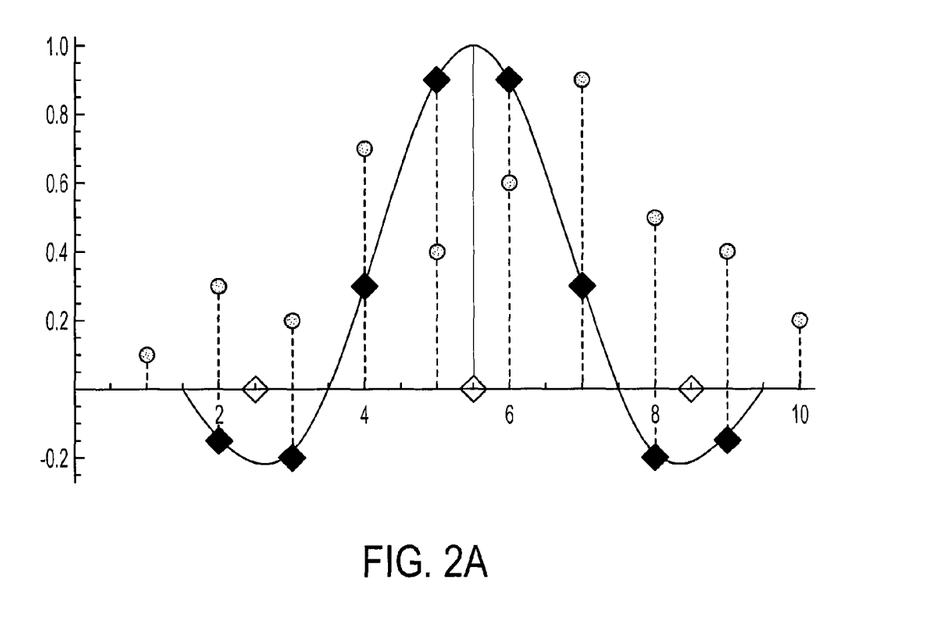
FIG. 2A shows an example of downsampling by a factor of 2 relative to the resampling example shown in FIG. 1.
Figure 2B:
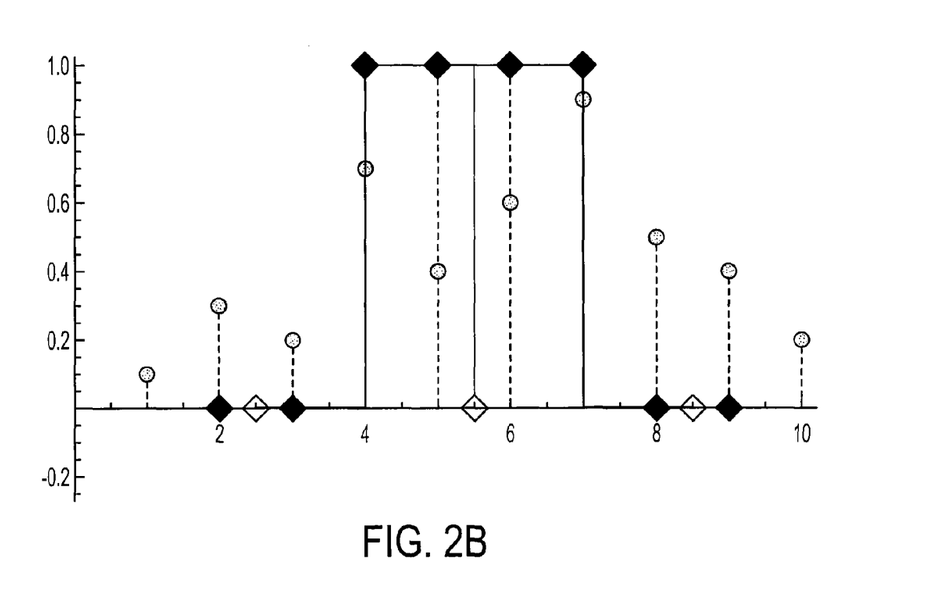
FIG. 2B also shows an example of downsampling by a factor of 2, but using an aggregation method.

Generalized downsampling is illustrated in FIG. 2A, which differs from resampling by the increased width of the IPR (in order to mitigate aliasing) and the increased spacing of the output samples. FIG. 2A shows an example of downsampling by a factor of 2 relative to the resampling example shown in FIG. 1. A common form of downsampling is known as aggregation, in which input samples are simply summed together. Such aggregation is illustrated in FIG. 2B as a special case of downsampling, where the IPR is altered to have values of only 1 or 0. FIG. 2B shows an example of downsampling by a factor of 2, but using aggregation. In FIGS. 2A and 2B, the sampled input signal is presented by dots. The output grid is denoted by hollow diamonds. The input grid locations, in which the IPR is sampled, is presented as solid diamonds. The curve of the resampler IPR is shown centered on one of the output grid locations.

Imaging systems collect pixels on a collection grid that has approximately uniform angular spacing in the instrument's coordinate system. In many applications it is desirable to map these pixels to a uniform geo-centric angular grid, such as latitude-longitude. The function that maps the collection sample grid to the Earth's surface is nonlinear. Accordingly, a uniform grid on the Earth's surface maps to a nonuniform grid in the instrument's coordinate system, and a uniform grid in the instrument's coordinate system maps to a nonuniform grid on the Earth's surface. For illustrative purposes, the present invention considers a case in which the collection grid is uniform and the output grid is nonuniform; the complementary case, of course, may also be considered by the present invention.

One approach to downsampling is to resample the imagery to a sparse grid using the same resampling kernel for all grid locations. A suitable kernel has to be chosen that compromises between poor spatial resolution that a low resolution kernel generates and high aliasing that a high resolution kernel generates. The disadvantages of this approach are as follows:

(1) The ground resolution is degraded by the same fraction at the edges of the field-of-view as at the center, so the spatial resolution of the mapped imagery also varies.

(2) If the downsampling maintains the ground resolution at the edges of the field-of-view, the center of the field-of-view is aliased.

(3) If the downsampling degrades the ground resolution such that the aliasing in the center is minimized, the ground resolution is significantly degraded at the edges.

Another approach for downsampling is to oversample the output grid at uniform spacing using a high resolution kernel, then lowpass filter the oversampled data with a filter whose cutoff varies with position in the field-of-view. This may be done, for example, by aggregating a different number of the oversampled values at different locations, with more aggregation in the center of the field-of-view and less aggregation at the edges. This approach produces a somewhat uniform ground resolution while limiting aliasing that is introduced by the downsampling. There are disadvantages to this approach, however, as follows:

(1) The ground resolution depends on the number of samples aggregated, which is quantized. Adjacent pixels may have ground resolutions that differ by factors of 2. Variations in collection geometry may cause different images to have different ground resolutions at the same point on the ground.

(2) The ground resolution may still vary across the field-of-view and may not be sufficiently uniform for use by automated image exploitation algorithms.

(3) The oversampling factor must be limited in order for the computational load to be manageable, and may limit the image size processed. Limiting the oversampling factor impacts ground resolution, as indicated above.

As will now be explained, unlike the above described approaches to downsampling, the present invention automatically adjusts the resampling kernel in a mapping image system. In this manner, the spatial resolution of the output signal is substantially constant everywhere on the output grid of the Earth's surface. In addition, aliasing is independent of the input grid spacing.

Accordingly, there is no need by the present invention to compromise between consistency of the spatial resolution and the amount of aliasing. Neither is there a need for oversampling and then requiring additional processing to regularize the spatial resolution. Thus, the present invention advantageously produces better quality data, and achieves this with less computation.

Figure 3A:
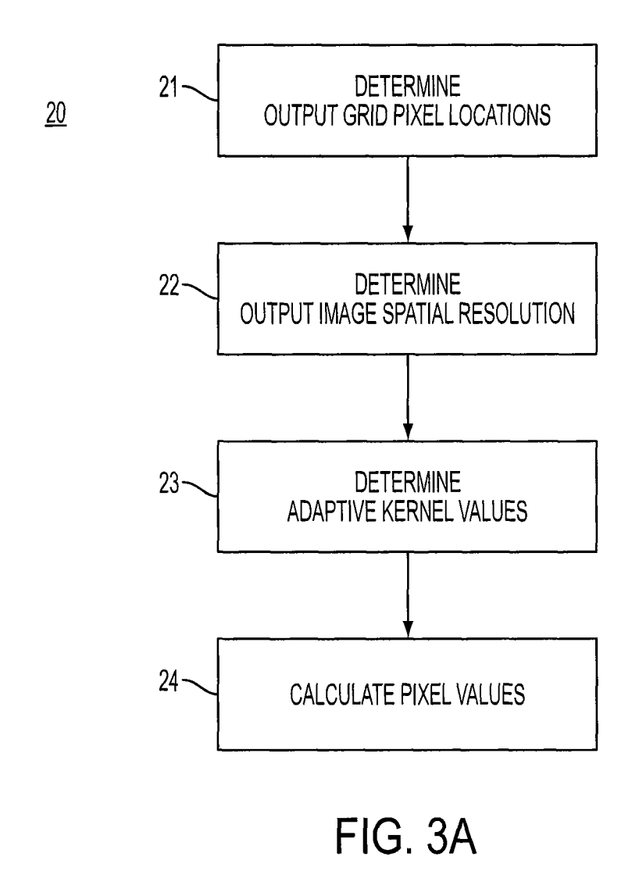
FIG. 3A is a flow diagram depicting an exemplary resampling process using an adaptive kernel for downsampling data on a first grid into data on a second irregular grid, in accordance with an embodiment of the present invention.

Referring now to FIG. 3A, there is shown an exemplary method for adaptive downsampling, designated as 20, which may be executed by a microprocessor, a processor, a microcontroller, or controller. Such processor or controller may reside in any platform, such as in a satellite receiving images of the Earth (as an example), or in a ground station processing the images upon transmission from the satellite (see FIG. 5 for an exemplary image mapping system). The downsampled images may be stored in a storage device, or viewed on a display by an end user.

As shown in FIG. 3A, method 20 uses step 21 to determine the output grid pixel locations, namely:

$$m\lambda_r + \phi_r$$

where m is an integer, and
$\lambda_r$ is the pixel spacing of the output grid.

In step 22, the desired output image spatial resolution, $\rho$, is determined. As an example, $\rho$ may be 1.5 times $\lambda_r$.

There are several measures of spatial resolution that could be selected, and matching spatial resolution depends on the measure selected. Ideally, the modulation transfer function (MTF) of all output pixels of the imager may be matched so that each pixel has exactly the same spatial response and, therefore, the same resolution. In practice matching the pixel's MTF at all frequencies may be problematic. It turns out, however, that by matching the MTF of the pixels at one spatial frequency, edge responses that vary by only a few percent may also be obtained. Such matching may produce substantially the same spatial resolution for all pixels.

A resolution measure that is used by the present invention to obtain the image spatial resolution of $\rho$ is the horizontal spatial resolution (HSR), defined as follows:

$$\rho = \frac{1}{2k_{0.5}}$$

where $k_{0.5}$ is the spatial frequency at which the imager's MTF has a value of 0.5.

Alternatively, the present invention may use any other criteria for measuring and matching the spatial resolution. It will be appreciated that $k_{0.5}$ is the spatial frequency in the output grid, which has units of cycles/km. For example, when matching the spatial resolution of an idealized rectangular function IPR, the value of $k_{0.5}$ is as follows:

$$k_{0.5} = \frac{0.6034}{\pi\rho} \cong \frac{1}{8\lambda_r}$$

Returning to FIG. 3A, step 23 calculates resampler tuning parameter values, also referred to herein as adaptive kernel values. These values are determined for the pixels of the output image, so that the spatial resolution of the output image in the output grid becomes substantially the same everywhere. The adaptive kernel values are stored in a lookup table (LUT). More detail of how the adaptive kernel values are computed is described below with respect to FIG. 3B.

Having computed and stored the adaptive kernel values for each output sample location, step 24 calculates the output pixel values based on the stored adaptive kernel values. More detail of how the output pixel values are computed is described below with respect to FIG. 3B.

Figure 3B:
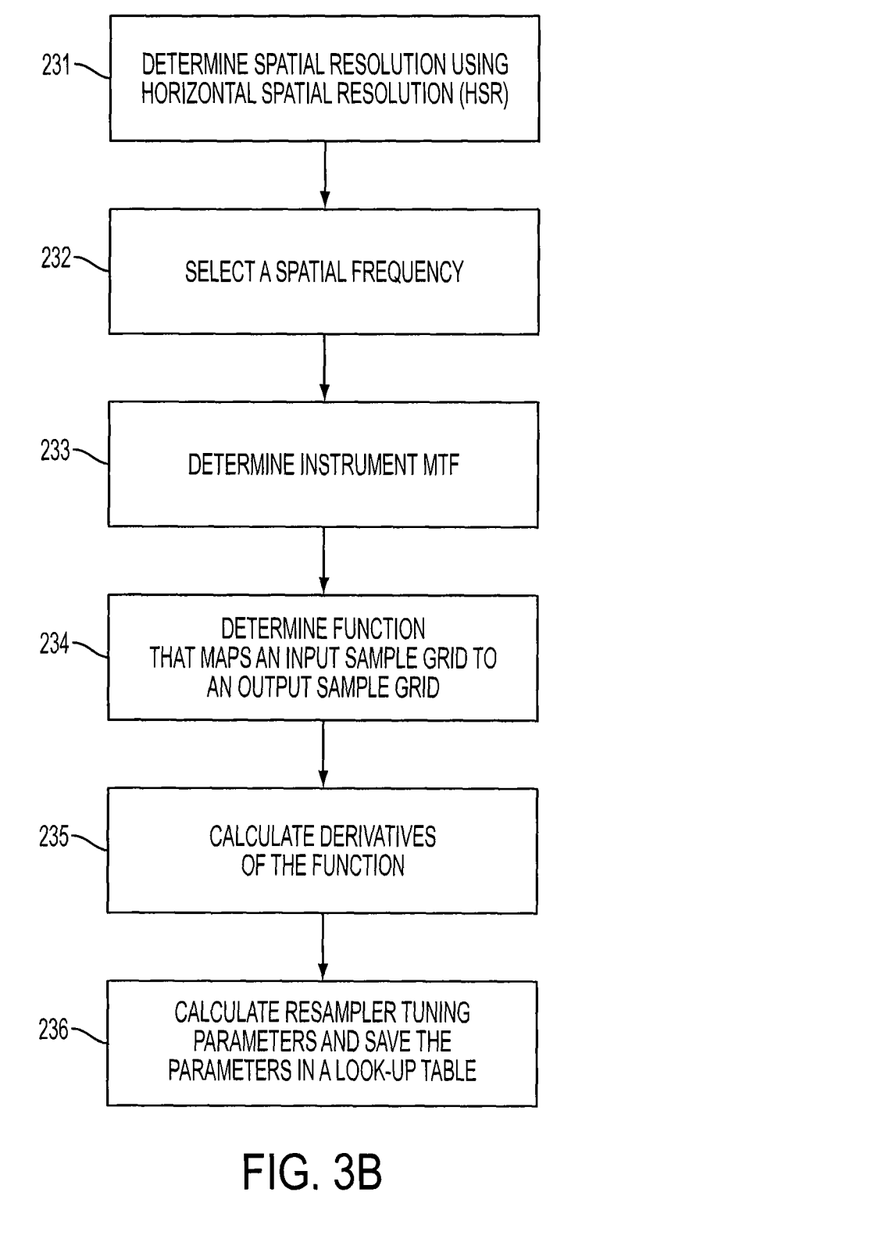
FIG. 3B is a flow diagram depicting an exemplary method for calculating the adaptive kernel, in accordance with an embodiment of the present invention.

Referring now to FIG. 3B, step 231 determines the image spatial resolution of $\rho$ based on the horizontal spatial resolution (HSR), defined as follows:

$$\rho = \frac{1}{2k_{0.5}}$$

where $k_{0.5}$ is the spatial frequency at which the imager's MTF has a value of 0.5.

The $k_{0.5}$ is the spatial frequency in the output grid, which has units of cycles/km. The method in step 232 selects this spatial frequency for an IPR function. For example, when matching the spatial resolution of an idealized rectangular IPR function (as shown in FIG. 2B), the value of $k_{0.5}$ is as follows:

$$k_{0.5} = \frac{0.6034}{\pi\rho} \cong \frac{1}{8\lambda_r}$$

The MTF of the imager or the instrument is determined by step 233. The MTF is determined, in instrument coordinates, based on the instrument's spatial response, by the Fourier transform of the instrument impulse response function:

$$H_s(k) = \Im\{h_s(\alpha_s)\}$$

The spatial response is in the input sample grid, and the MTF frequencies have units of cycles/radian.

In step 234, the function M needs to be determined. This function maps the output pixel grid to the input sample grid, as follows:

$$\alpha = M(\lambda)$$

where, in an exemplary embodiment, M maps latitude and longitude into the instrument's line-of-sight (LOS) angles.

In step 235, the derivative of the function M is calculated. The derivative is calculated for every output pixel grid location, $\lambda_m$, as follows:

$$\left.\frac{\partial M(\lambda)}{\partial \lambda}\right|_{\lambda_m}$$

As an example, the derivative of the mapping function between latitude and a north scan angle of an imager in a geosynchronous orbit with an orbital inclination of zero is given by $$\frac{\partial M(\lambda)}{\partial \lambda} = \frac{r_e[r_e\cos(\Lambda - \Lambda_0) - R_s\cos\lambda]}{R_s^2 + r_e^2 - 2r_e R_s\cos(\Lambda - \Lambda_0)\cos\lambda - r_e^2\sin^2(\Lambda - \Lambda_0)\cos^2\lambda}$$

where
$\lambda$ is the latitude of the point on the Earth's surface
$\Lambda$ is the longitude of the point on the Earth's surface $r_e$ is the radius of the Earth at the given latitude and longitude $R_s$ is the radius of the satellite's orbit $\Lambda_0$ is the longitude of the sub-satellite point.

A similar expression may be derived for the mapping function between longitude and an east scan angle. More complex expressions may be derived for other orbits.

In step 236, the value of a resampler tuning parameter, $\eta(\lambda_m)$, for each output pixel grid location is calculated. All the tuning parameters are saved in a lookup table (LUT). Each tuning parameter has a value for each output pixel location, $\lambda_m$, such that the following equation is satisfied:

$$H_r(k_{0.5}, \eta(\lambda_i)) = \frac{0.5}{H_s\left(k_{0.5} \bigg/ \frac{\partial M(\lambda)}{\partial \lambda}\bigg|_{\lambda_m}\right)}$$

Lastly, the pixel values or resampled signal samples are calculated, using step 24 in FIG. 3A. The pixel values may be calculated using the following equation:

$$s(m) = \sum_n g(\lambda_n) h_r(\lambda_n - m\lambda_r - \phi_r, \eta(m\lambda_r + \phi_r))$$

where $\lambda_n = M^{-1}(n\alpha_d + \phi_d)$ and $M^{-1}$ is the inverse of M, which maps the input sample grid to the output sample grid.

The adaptive downsampling method of the present invention may work with any resampler IPR. Most resamplers do not have a built-in tuning parameter that may be used to change the spatial response of the resampler. For these resamplers, the IPR may still be tuned using the procedure illustrated in FIG. 4.

Figure 4:
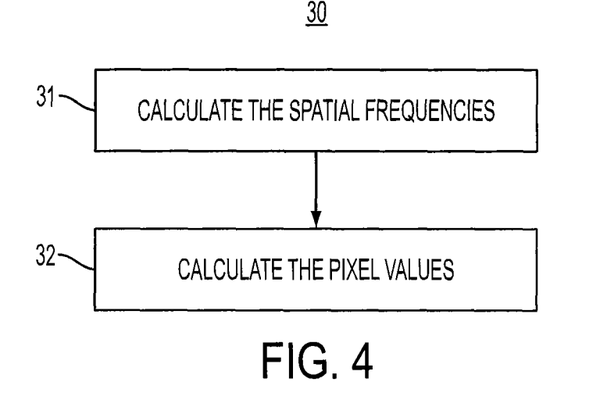
FIG. 4 is a flow diagram depicting another exemplary method for downsampling to an irregular grid without using an adaptive kernel, in accordance with an embodiment of the present invention.

As shown, step 31 calculates the spatial frequencies $k_n$ for which the following equation is satisfied:

$$H_r(k_n) = \frac{0.5}{H_s\left(k_{0.5} \bigg/ \frac{\partial M(\lambda)}{\partial \lambda}\bigg|_{\lambda_m}\right)}$$

Step 32 calculates the pixel values using the following equation:

$$s(m) = \sum_n g(\lambda_n) h_r\left(\frac{\lambda_n k_{0.5}}{k_n} - m\lambda_r - \phi_r\right)$$

The adaptive downsampling described above may be extended to two or more dimensions. The mathematics presented above is for a one dimensional (1D) case. To extend the downsampling to more than one dimension, one needs to repeat the aforementioned procedures in each of the dimensions. A multidimensional downsampling IPR may also be used by combining multiple one-dimensional resamplers. Similar to the 1D case, a multidimensional IPR may be centered on the output grid location. Unlike the 1D case, there are additional degrees of freedom for aligning the IPR. The IPR may be rotated to align its sides with the input sample grid.

Figure 5:
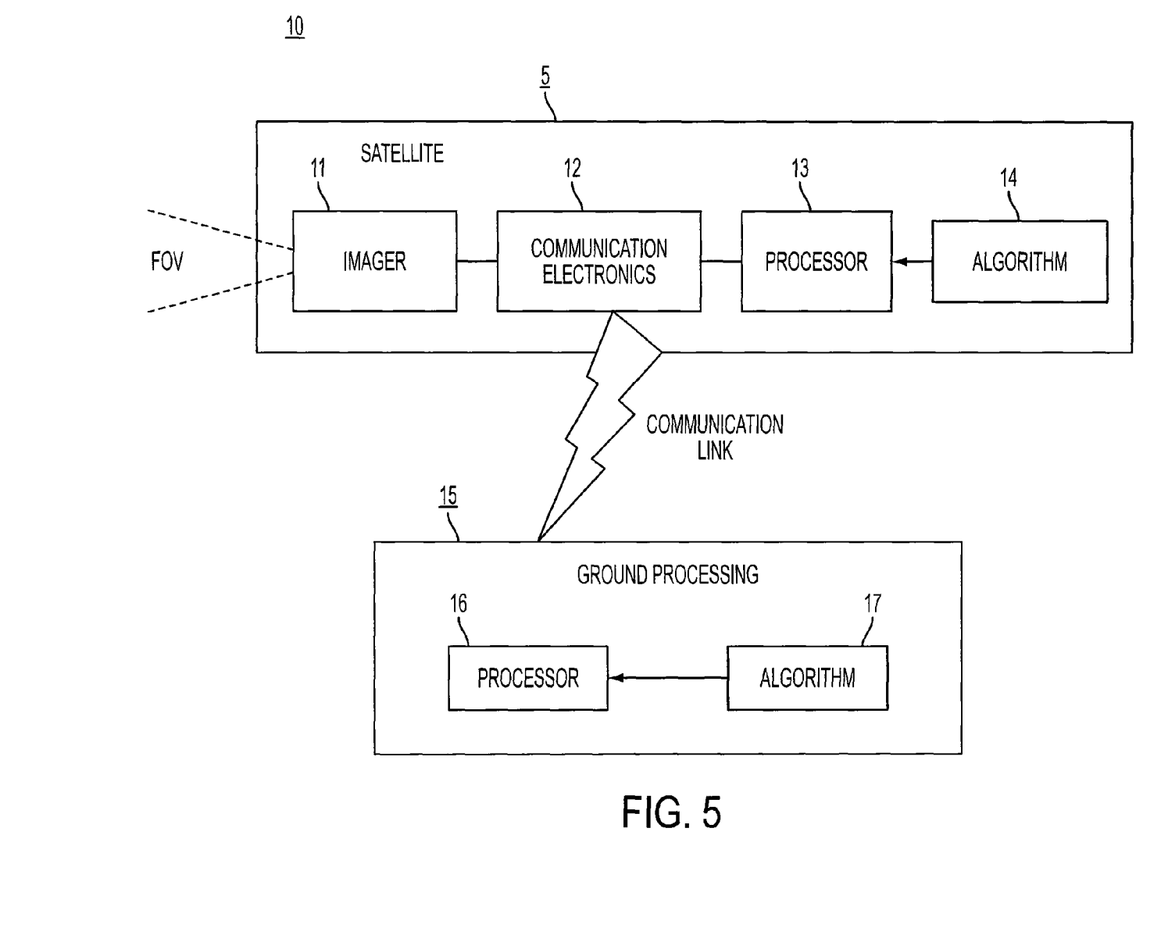
FIG. 5 is a functional block diagram of an imaging system providing data, plotted on an input grid, to a processor, which resamples the data plotted on an output grid, in accordance with an embodiment of the present invention.

Referring now to FIG. 5, there is shown an image mapping system, generally designated as 10, which may employ the adaptive downsampling of the present invention. As shown, image mapping system 10 includes satellite 5 and ground processing station 15.

Satellite 5 is imaging the Earth, as an example. Satellite 5 includes imager 11, communications electronic module 12, and processor 13. The processor is shown executing algorithm 14. The imager may have an array of pixels for imaging the Earth at a predetermined field-of-view. The module 12 may amplify and digitize the image to form input data which may be sampled onto a first grid spacing. The sampled data may be stored in the satellite, or transmitted down to ground processing station 15 and stored therein. Electronic modules 12 may also include the communications, command and control required for downlinking the detected input data to ground processing station 15. Algorithm 14 is an algorithm providing the adaptive downsampling of the present invention. The algorithm may be executed by processor 13.

Ground processing station 15 includes processor 16 which executes algorithm 17. Algorithm 17 may include the same adaptive downsampling methods as those included in algorithm 14. Alternatively, the adaptive downsampling of the present invention may be installed either in satellite 5 or in ground processing station 15.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, the present invention may be used in the following additional applications:

(a) mapping images to different coordinate systems for image analysis and exploitation and geographic information system (GIS) applications;

(b) image processing and display;

(c) adaptive anti-aliasing filters; and (d) mapping textures to surfaces for computer generated animation, vehicle training simulators and video gaming applications.

What is claimed:

1. A method of adaptive downsampling comprising the steps of:
   receiving input data having a first spatial resolution and a first grid spacing;
   resampling the input data using an automatically adjustable kernel; and
   providing output data having a second spatial resolution and a second grid spacing;
   wherein the second spatial resolution is substantially constant across the second grid spacing; and
   including the step of:
      determining the automatically adjustable kernel;
      wherein the input data includes an image received by a field-of-view (FOV) of an instrument, and
   determining the automatically adjustable kernel includes:
   determining MTF of the instrument as a function of spatial frequency;
   determining a function that maps the second grid spacing of the output data to the first grid spacing of the FOV of the instrument; and
   calculating the kernel for each of the grid locations, in which the MTF has a predetermined value.

2. The method of claim 1 wherein
the input data includes image data, and
the output data includes resampled data of the image data.

3. The method of claim 2 wherein the image data are images of the earth at the first spatial resolution and the first grid spacing, and the output data are resampled data of the images of the earth at the second spatial resolution and the second grid spacing.

4. The method of claim 1 wherein receiving the input data includes receiving image data from an instrument disposed in an orbiting platform, in which the instrument includes pixels in a focal planar array (FPA), the pixels providing the first spatial resolution at the first grid spacing; and providing the output data includes outputting images of the earth in an earth coordinate system having the second spatial resolution at the second grid spacing.

5. The method of claim 1 wherein calculating the kernel includes finding a spatial frequency in which the MTF has a value of 0.5.

6. The method of claim 1 wherein calculating the kernel includes calculating a derivative of the function at each of multiple grid locations of the second grid spacing, and using the derivative to obtain a tuning parameter at each of the multiple grid locations.

7. The method of claim 1 including the step of:

storing a respective tuning parameter for each of the grid locations in a look-up table (LUT).

8. A method of resampling an image comprising the steps of:

obtaining samples of a scene using a field-of-view (FOV) of an imager, wherein the imager obtains the samples in a first coordinate system;

calculating an adaptive kernel at each location of the samples in the first coordinate system; and using the adaptive kernels to obtain a resampled image of the scene in a second coordinate system, wherein the adaptive kernels provide a substantially constant spatial resolution of the resampled image; and calculating the adaptive kernels includes:

determining MTF of the imager as a function of spatial frequency;

determining a function that maps the samples in the first coordinate system into the resampled image in the second coordinate system; and calculating a respective adaptive kernel at each of the locations in the first coordinate system using a predetermined value of the MTF.

9. The method of claim 8 wherein the imager is disposed in a platform for imaging the scene located on the Earth.

10. The method of claim 8 wherein the first coordinate system includes a first spatial resolution and a first grid spacing across the FOV of the imager, and the second coordinate system includes a second spatial resolution and a second grid spacing across a map of the scene.

11. The method of claim 8 wherein calculating the respective adaptive kernel includes finding a spatial frequency in which the MTF has a value of 0.5.

12. The method of claim 8 wherein calculating the respective adaptive kernel includes calculating a derivative of the function at each of the locations of resampled image in the second coordinate system, and using a respective derivative to obtain a respective tuning parameter.

13. A system for resampling an image comprising:

an imager for viewing a scene and obtaining samples of the scene in a first coordinate system, a display for viewing the scene in a second coordinate system, a processor for calculating an adaptive kernel at each location of the samples in the first coordinate system, and the processor for obtaining a resampled image of the scene in the second coordinate system using the adaptive kernels, wherein the adaptive kernels provide a substantially constant spatial resolution of the resampled image, and the processor executes the following steps:

determining MTF of the imager as a function of spatial frequency;

determining a function that maps the samples in the first coordinate system into the resampled image in the second coordinate system; and calculating a respective adaptive kernel at each of the locations in the first coordinate system using a predetermined value of the MTF.

14. The system of claim 13 wherein the platform includes a satellite for monitoring the Earth.

15. The system of claim 13 wherein the processor is disposed in the satellite.

16. The system of claim 13 wherein the processor is disposed in a ground station, a transmitter sends the samples of the scene to the ground station, and the display is disposed in the ground station.

17. The system of claim 13 wherein the processor executes the following additional steps:

calculating a derivative of the function at each of the locations of resampled image in the second coordinate system, and using a respective derivative to obtain a respective tuning parameter.

* * * * *